J. BRENZINGER.
SOLDERING MACHINE.
APPLICATION FILED SEPT. 17, 1908.

980,755.

Patented Jan. 3, 1911.

10 SHEETS—SHEET 4.

J. BRENZINGER.
SOLDERING MACHINE.
APPLICATION FILED SEPT. 17, 1908.

980,755.

Patented Jan. 3, 1911.
10 SHEETS—SHEET 5.

WITNESSES

INVENTOR
Julius Brenzinger
BY
ATTORNEY

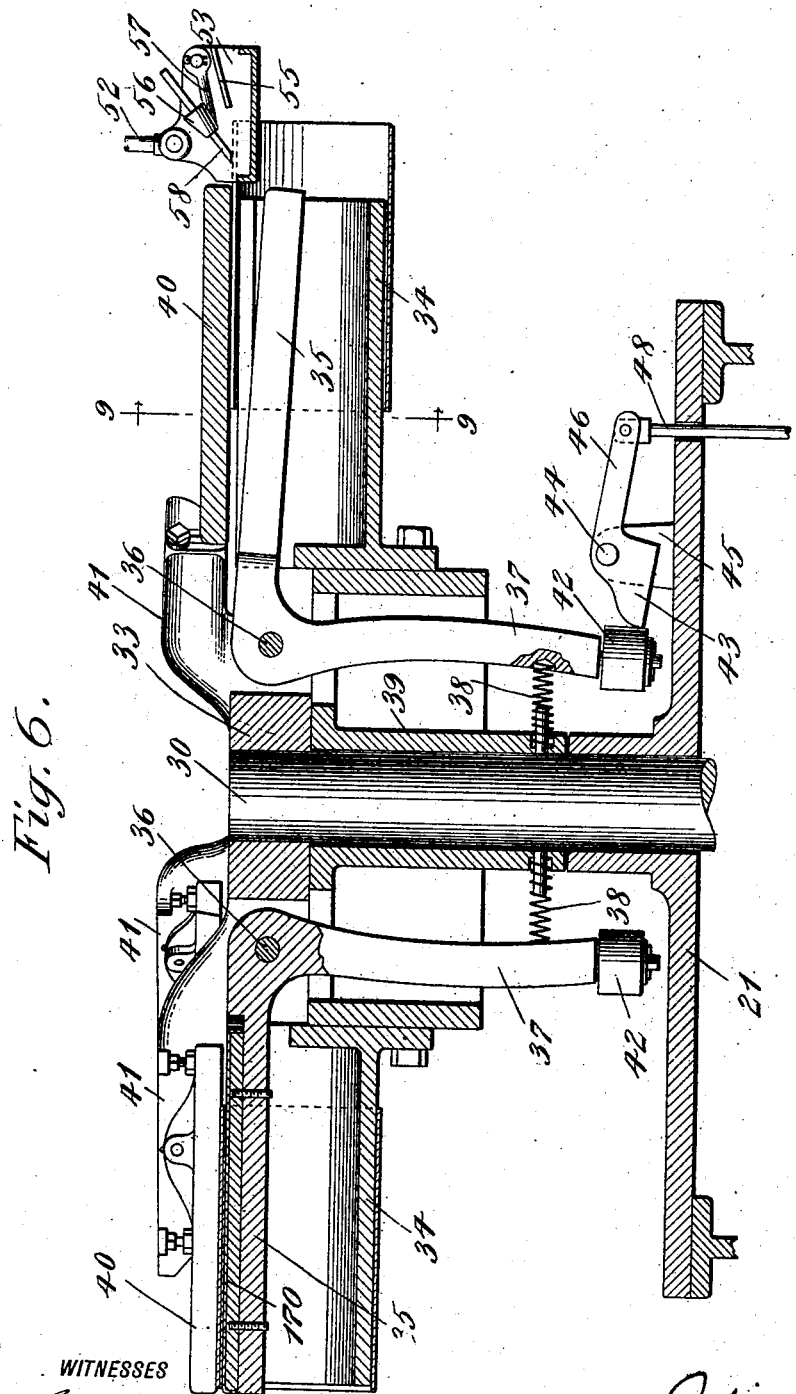

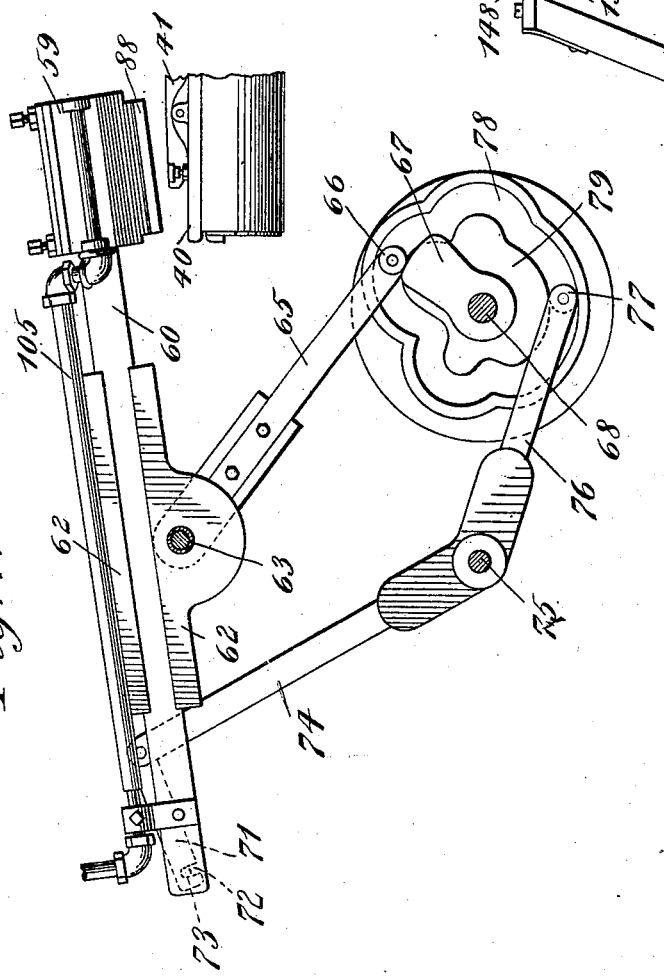

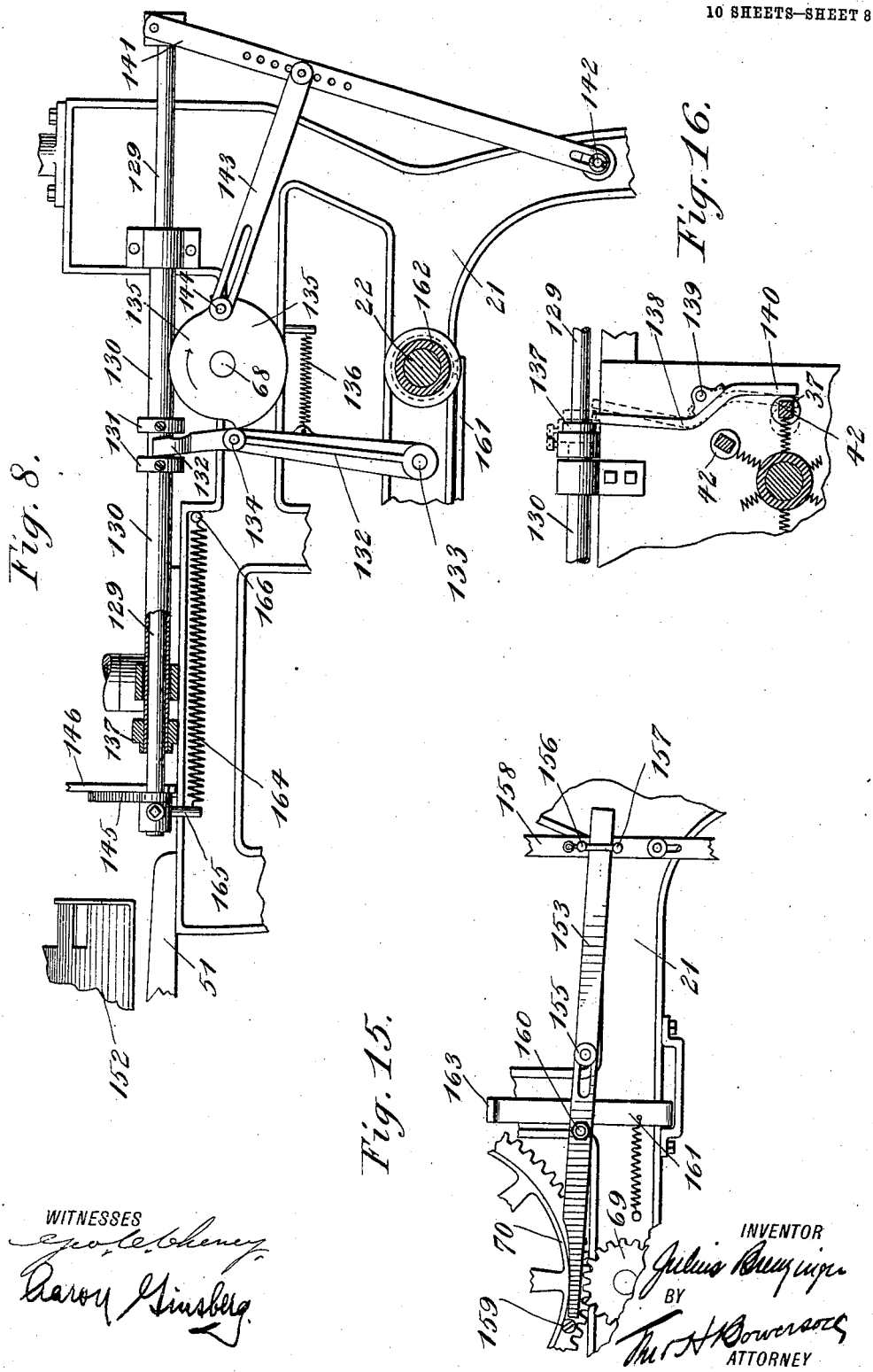

J. BRENZINGER.
SOLDERING MACHINE.
APPLICATION FILED SEPT. 17, 1908.
980,755.
Patented Jan. 3, 1911.
10 SHEETS—SHEET 9.
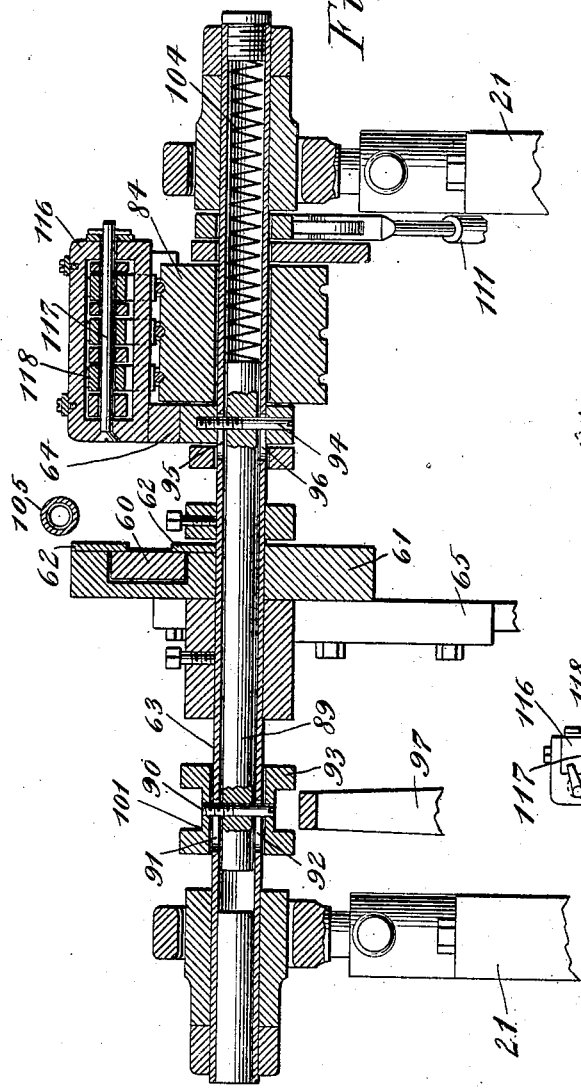
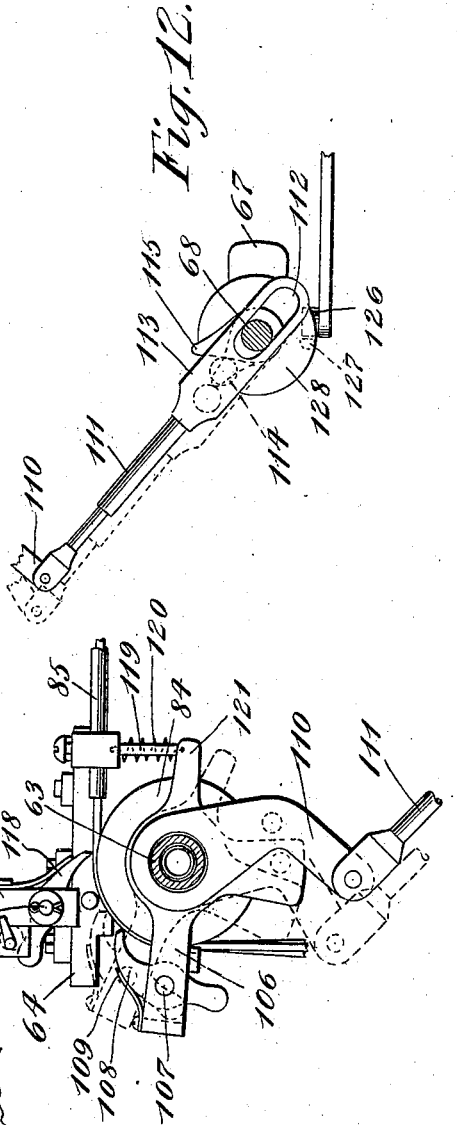

J. BRENZINGER.
SOLDERING MACHINE.
APPLICATION FILED SEPT. 17, 1908.
980,755.
Patented Jan. 3, 1911.
10 SHEETS—SHEET 10.
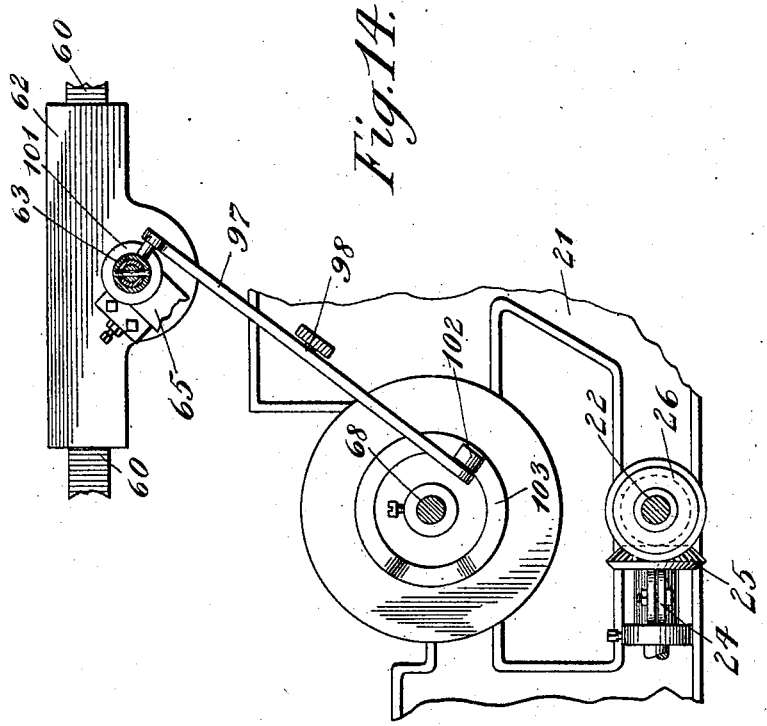
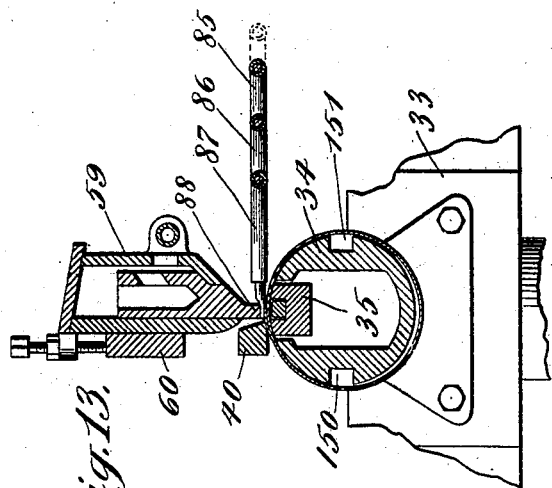
WITNESSES
INVENTOR
BY
ATTORNEY

UNITED STATES PATENT OFFICE.

JULIUS BRENZINGER, OF MOUNT VERNON, NEW YORK, ASSIGNOR TO MAX AMS MACHINE COMPANY, OF MOUNT VERNON, NEW YORK, A CORPORATION OF NEW YORK.

SOLDERING-MACHINE.

980,755.     Specification of Letters Patent.     Patented Jan. 3, 1911.

Application filed September 17, 1908. Serial No. 453,566.

*To all whom it may concern:*

Be it known that I, JULIUS BRENZINGER, a citizen of the United States, residing at Mount Vernon, in the county of Westchester and State of New York, have invented certain new and useful Improvements in Soldering-Machines, of which the following is a specification.

This invention relates generally to soldering machines, and particularly to machines for automatically applying and distributing solder to suitably secure together the overlapping end edges of the formed sheet-metal blank to produce a can body.

The principal object of the present invention is the provision of a machine which may, with few changes of parts and a minimum re-adjustment, be quickly and easily adapted to any one of a number of different sizes and shapes of can bodies.

Incidental to the above, this invention has in view certain improvements in machines of this class with a view to simplifying the construction thereof and enhancing their efficiency and dependability.

My invention will be readily understood by reference to the accompanying drawings, forming a part of this specification, in which—

Figure 1:
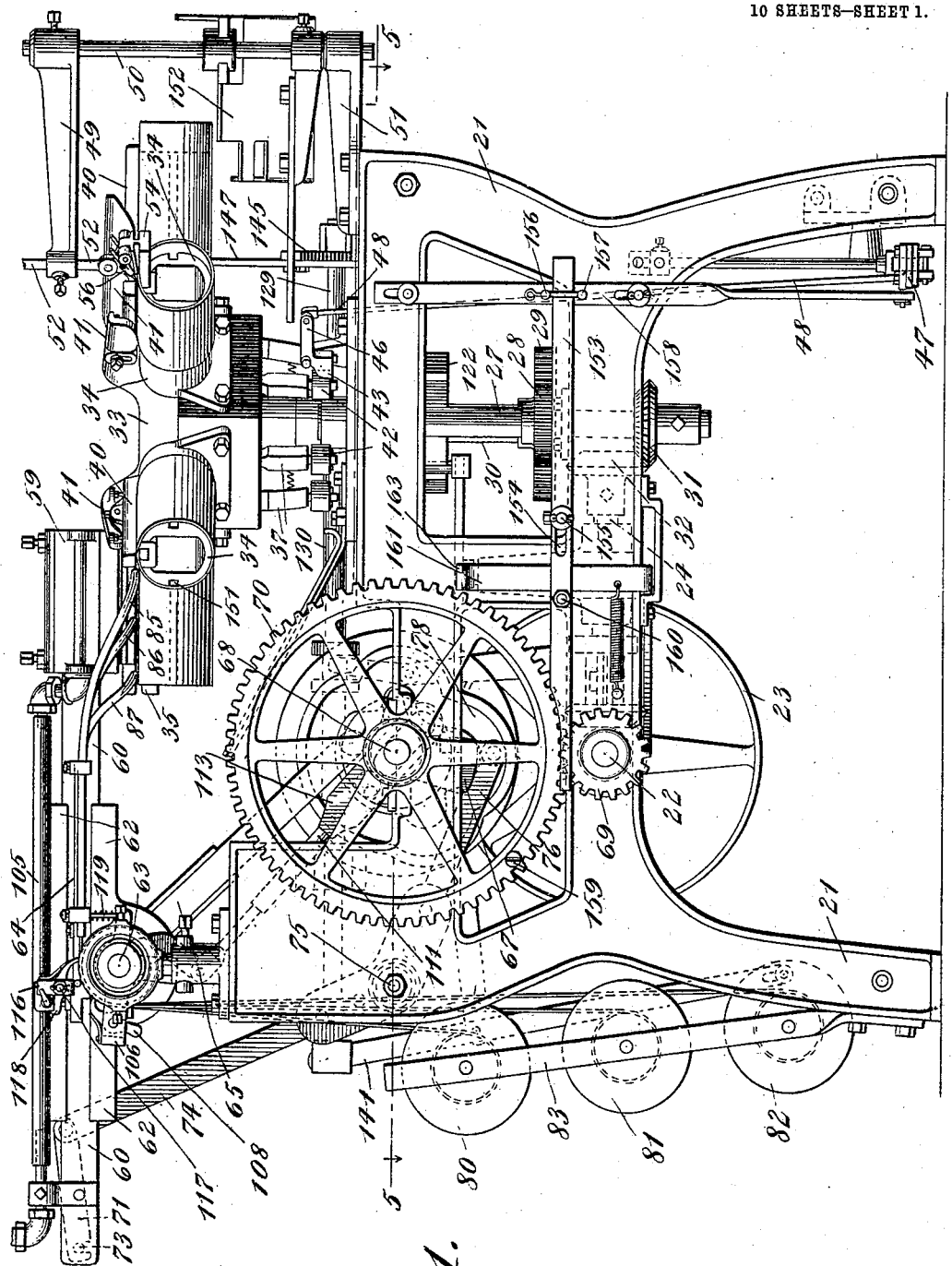
Figure 2:
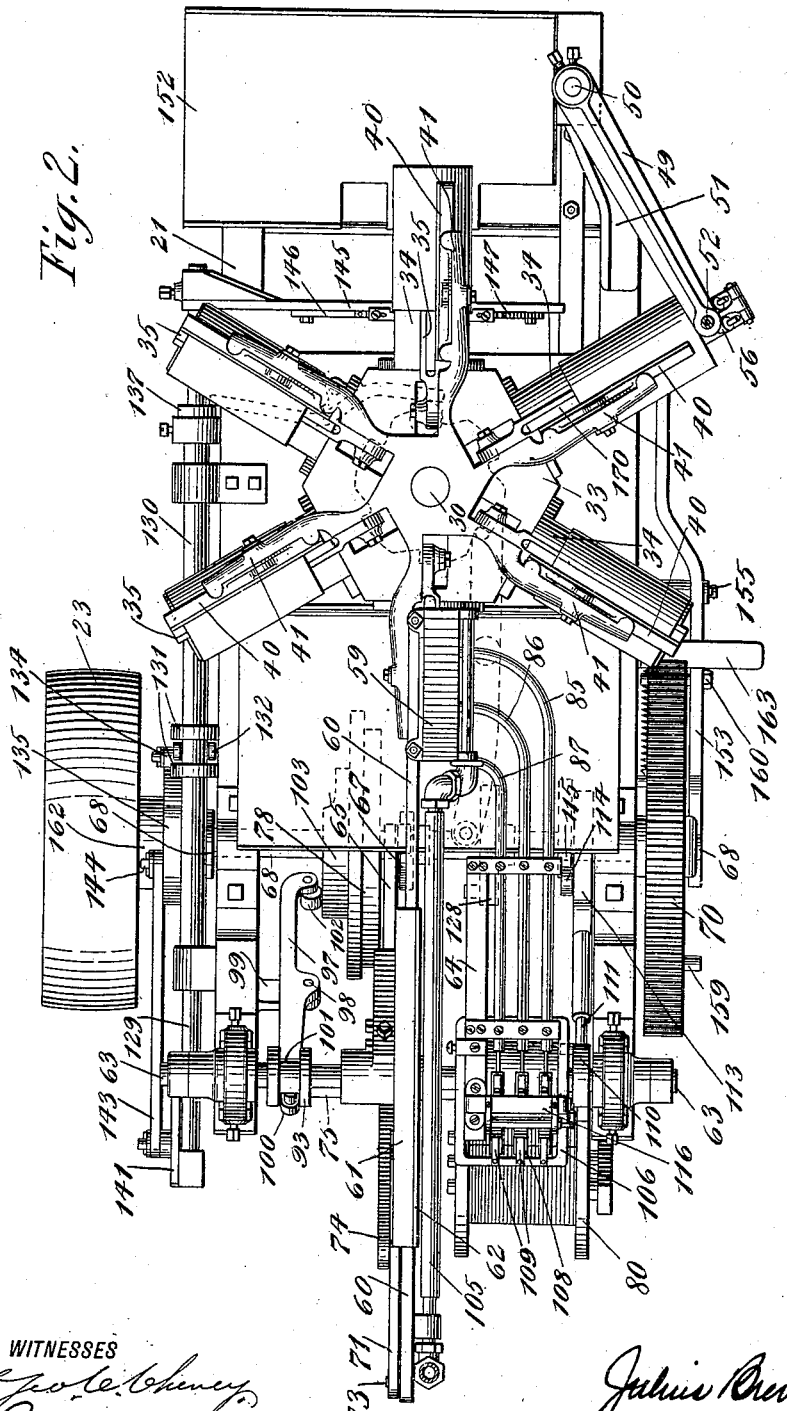
Figure 3:
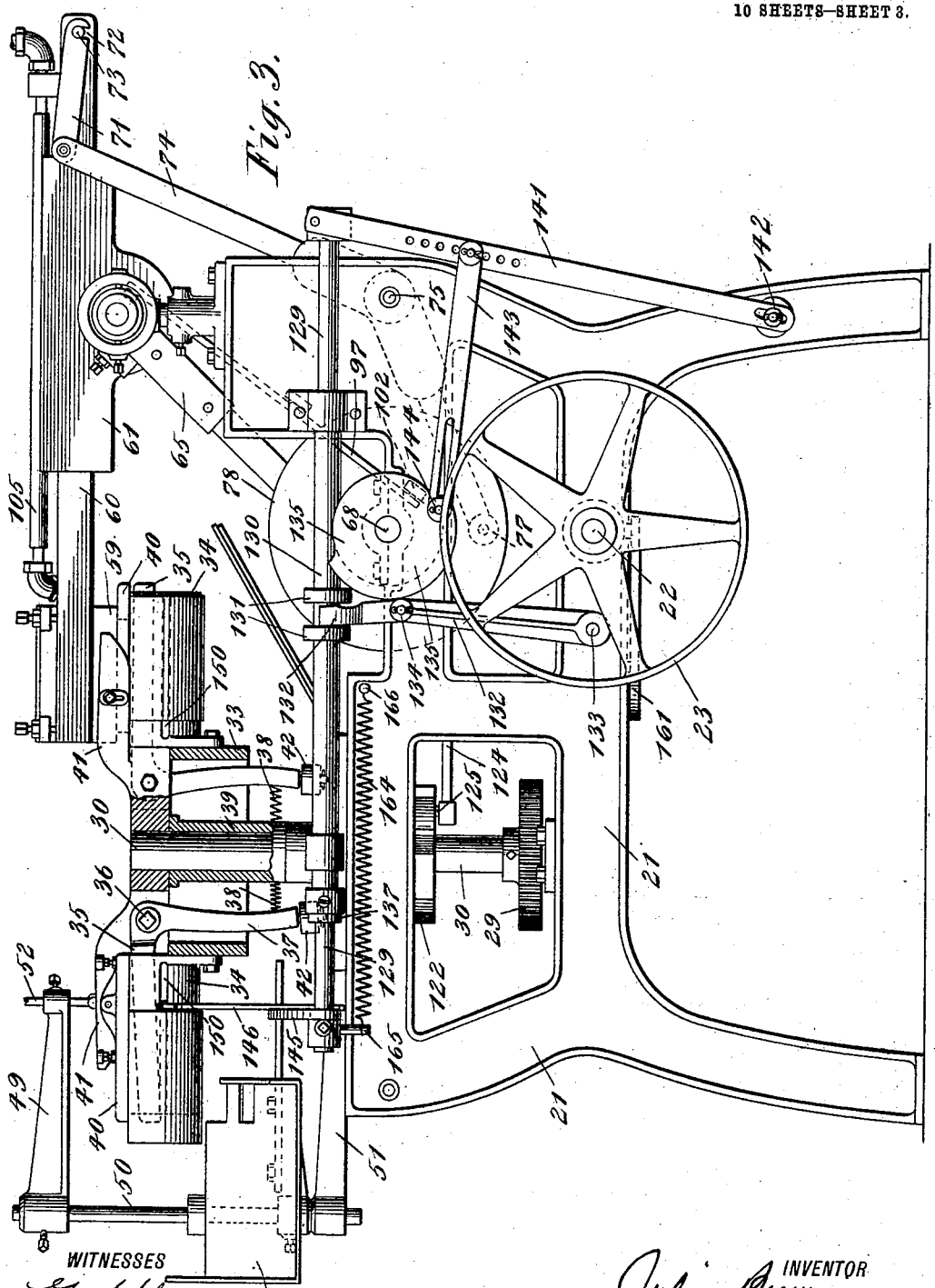
Figure 4:
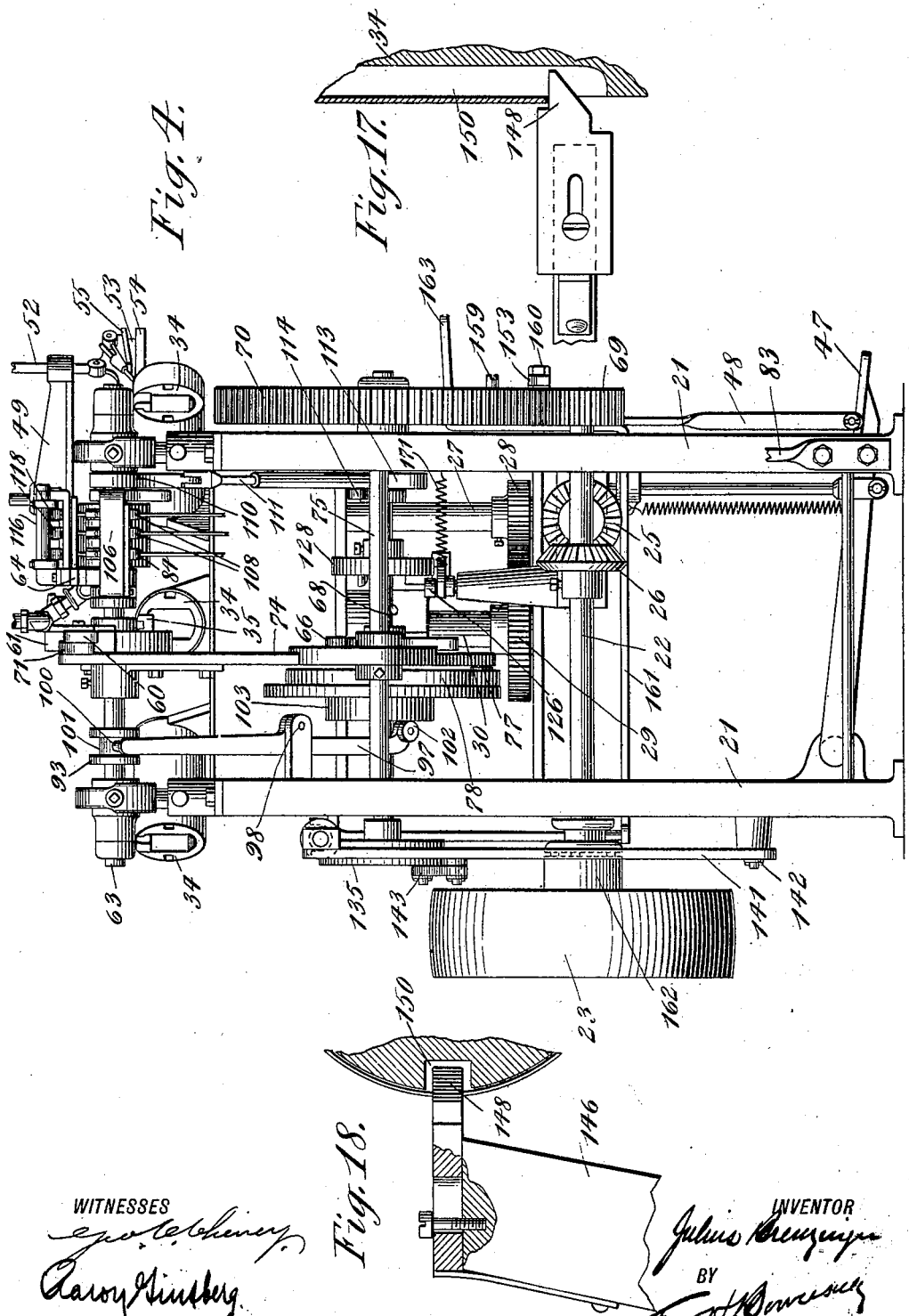
Figure 5:
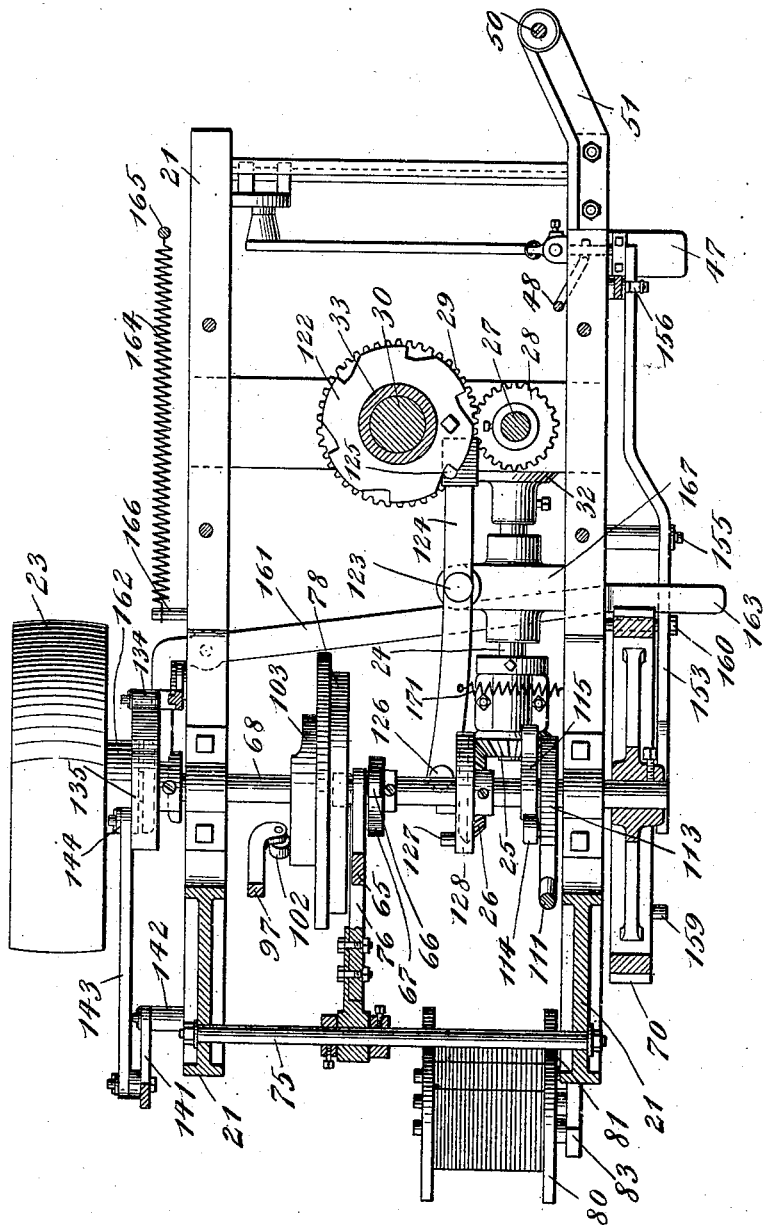

Figure 1 is a side elevation of a machine embodying my invention; Fig. 2 is a top plan view thereof; Fig. 3 is an elevation of the side opposite to that shown in Fig. 1; Fig. 4 is a rear elevation of the same, with the solder-wire coils removed; Fig. 5 is a horizontal section taken substantially on the line 4—4 of Fig. 1; Fig. 6 is an enlarged detail view, partly in section, of the cambody carrier and parts of its operating mechanism; Fig. 7 is an enlarged detail view of the soldering iron and parts of its operating mechanism; Fig. 8 is a partly sectional elevation of the mechanism for ejecting the soldered bodies; Fig. 9 is an enlarged sectional end view of the ejecting mechanism; Fig. 10 is an enlarged section through the rear shaft, looking forwardly; Figs. 11 and 12 are enlarged detailed views of different parts of the solder-feed mechanism; Fig. 13 is a sectional end view of the soldering iron, and Figs. 14, 15, 16, 17 and 18, are detailed views hereinafter described.

Referring now to the drawings in detail, numeral 21 refers to the heavy supporting frame upon which the various parts of my machine are mounted. Suitably journaled in the lower portion of this frame, is the power shaft 22 carrying the pulley 23, which is driven in the usual manner from any suitable source of power. Also suitably journaled in the frame 21, and disposed at right angles to the shaft 22, is the shaft 24 (best shown in Fig. 5) which is driven from the shaft 22 through the medium of the bevel gear 25 on said shaft 24 in mesh with the similar gear 26 on the shaft 22. Said shaft 24 is in two parts, connected by the friction-drive device 167, and through the bevel gears 31 and 32, frictionally drives the vertical shaft 27, upon which is mounted the gear 28 in mesh with the gear 29 on the vertical shaft 30. It will therefore be seen that through said friction-drive device the shaft 30 may be normally rotated by said shaft 22, yet may be stopped at any time without stopping the shaft 22 or the mechanism connected to and driven by the latter. These friction-drive devices or clutches are in common use, and as no invention is claimed for the one shown, a detailed description thereof is not believed to be necessary.

The shaft 30 is designed to drive the carrier for the formed blanks, and to this end is provided with a head 33 from which project any desired number of radial arms 41, six being shown in the drawings. To the head 33, below each of these arms, is secured a supporting and retaining mandrel, of substantially the configuration of the desired form of can body. The machine illustrated being designed to close and seal what are known as "round" cans, this mandrel is shown of substantially cylindrical configuration. As best shown in Figs. 6, 9 and 13, the mandrel 34 (and these mandrels being identical in all respects a detailed description of one will suffice for all thereof) is hollow, with the upper face thereof in the form of an arm 35 pivoted at 36 in said head 33. This arm 35 forms one of the arms of a bell crank lever, of which the downwardly projecting arm 37 is the other. A compression spring 38, acting against said arm 37 and the sleeve 39 on the shaft 30, tends to keep the arm 35 normally in its elevated position, with the upper face thereof flush with the upper face of the mandrel of which it then forms a part. The formed blank, the overlapping ends of which it is desired to secure together, is designed to be slipped upon this mandrel when it is in the position indicated in Fig. 2. The end edges of the blank are overlapped as indicated in Fig. 9, with the right hand edge overlapping the left hand edge. This is done in order that the two edges may be held together by the edge of the block 40 removably secured to the arm 41, with said block 40 located sufficiently to one side to be non-interferent with the operation of the soldering iron, as hereinafter described. These arms and the blocks secured thereto are so located that the block 40 is in such relative position with respect to the mandrel 34, that the unsoldered blank may be slid between these two members, and upon raising of the arm 35 is securely clamped therebetween. This arm 35 is reciprocated through movement of the arm 37, and to effect such movement at the proper time, I provide a roller 42 at the end of said arm 37, adapted to impinge against the block 43 when a portion of the latter is brought into the path of movement of said roller. Normally, said arm 37 is forced outwardly by the spring 38, and the arm 31 and the block 40 are thereby clamped together. In order that the block 43 may be raised into the path of movement of said roller 42, I pivot the former at 44 to the standard 45 on the frame 21, and provide the lever-arm 46 between which and the foot-treadle 47 a connecting rod 48 is interposed. Obviously, when said treadle 49 is depressed (the latter being conveniently accessible to the operator when the latter is in position to feed the formed blanks upon the mandrels) the arm 47 will be depressed and the block 43 raised into the path of movement of the roller 42, forcing the latter inwardly against the action of the spring 38, and thereby depressing the arm 35 and permitting a formed blank to be inserted upon the mandrel with the superposed end edges thereof clamped together between the arm 35 and the block 40.

In order to prepare the overlapping edges for the soldering operation, I provide a fluxing device which includes the swinging arm 49, adjustably mounted upon the vertical rod 50 which is secured within the end of the bracket 51 mounted upon the frame 21 of the machine. Within the free end of the arm 49, is secured the tube 52, at the upper end of which (not shown in the drawings) may be mounted any desired form of reservoir or container for the fluxing solution. To the lower end of the tube 52 is pivoted the plate 53 at the bottom of which are the oppositely projecting integral guides 54, the upper faces of which not only properly direct the formed blank in its movement toward the mandrel, but which also form pads upon which, in any desired manner, a small quantity of the fluxing solution is permitted to drip. When it is desired to feed a formed blank upon the mandrel, the end edges thereof to be soldered are slightly separated and passed one to each side of the plate 53. Guides 55 direct the edges down upon the pads 54 against which they are held during the feeding operation by the weight 56 at the end of the loosely pivoted arm 57, which operates through the adjustable rod 58 to press said edges against said pad with sufficient firmness to cause them to take up the necessary amount of the fluxing solution. The formed blank is then properly positioned over the mandrel and clamped as explained by the arms 35 and 41.

Rotation of the head 33, as hereinbefore explained, advances the mandrel 34 until the latter and the blank thereon have been brought into proper position under the soldering iron 59. The soldering iron is suitably mounted at the end of the bar 60 which is slidable in a suitable groove in the block 61, wherein said bar is retained by the strips 62 62. Said block 61 is fixed upon the sleeve or hollow shaft 63, journaled in suitable bearings in the frame 21 of the machine. It will therefore be apparent that upon rocking the shaft 63, the soldering iron 59 will be raised and lowered, while, at the same time, the latter may be longitudinally reciprocated through imparting a sliding movement to the bar 60.

The soldering iron 59 is raised and lowered in the manner suggested, and such movement thereof properly timed, by the arm 65 fixed upon the sleeve or shaft 63 and having a roller 66 at the end thereof in coöperative positional relation to the cam 67 on the shaft 68, which is rotated by the pinion 69 on the shaft 22 in mesh with the gear 70 on said shaft 68. In this manner rotation of said shaft 68 will, through the cam 67, effect rocking movement of said shaft 63 and vertical reciprocation of said soldering iron. Longitudinal reciprocation of said soldering iron 59 at the proper time, is effected through the medium of an arm 71 having a slot 72 within which rides the pin 73 at the end of said bar 60. To the other end of said bar 71 is pivoted the arm 74 of a lever pivoted upon the stud or shaft 75, the other arm 76 of which is provided with a roller 77 operating in the cam-groove 78 of the cam 79. It will be noted that this cam-groove 78 has a substantially semi-circular portion, and that when said roller is in said semi-circular portion the cam 67 has operated against the roller 66 of the arm 65 and raised the soldering iron 59 free and clear of the formed blank on the mandrel which is then approaching said soldering iron, during which time there is no longitudinal movement of the bar 60 which carries said soldering iron. The configuration of the remaining portion of the cam-groove 78 is such that when cam 67 has cleared the roller 66, and the soldering iron 59 has been depressed against the formed blank on the mandrel underneath the same, said groove will operate through the roller 77 of the lever pivoted to the shaft 75 to reciprocate said bar 60 and move said soldering iron 59 back and forth along the overlapped or superposed edges of the blank.

The solder is in the form of wire strands and is preferably coiled upon three spools 80, 81 and 82, having axles which are suitably journaled in the bar 83 which is suitably fixed to the frame 21. From each of these spools, a strand of wire passes upwardly and into corresponding guide-grooves in the idler roller 84 and thence, respectively, into the guide-tubes 85, 86 and 87. This idler roller 84 is loosely journaled on the sleeve 63, and the guide-tubes 85, 86 and 87 are supported independently thereof in a manner hereinafter described. These guide-tubes direct the ends of the strands of solder wire to proper positions underneath the soldering iron 59. This soldering iron (as best shown in Figs. 7 and 13) comprises a casing which includes a lip 88 which has an edge adapted to impinge against the end of each solder wire and bite off a certain quantity of the solder, which is then, through the longitudinal reciprocal movement of the hot soldering iron, distributed along the superposed edges of the formed blank. This soldering iron 59 may be heated in any desired manner. I have shown the same of hollow construction and having a fluid supply pipe 105 leading to the same. This pipe 105 is secured to and forms a part of the support for said soldering iron and is therefore movable therewith. This pipe may be used to convey steam to the interior of said iron 59, or may be used to convey an inflammable gas to a suitable burner provided in the interior of said iron.

Within the sleeve 63 is provided the inner shaft 89 (see Fig. 10), this inner shaft 89 having a pin 90 projecting therethrough and through oppositely located longitudinal slots 91 and 92 in said sleeve 63. This pin 90 secures to said inner shaft 89 the grooved collar 93, while a corresponding pin 94 in said shaft 89 projects through the opposite slots 95 and 96 in said sleeve 63 and secures to said inner shaft 89 the L-shaped frame 64. It will be apparent that the inner shaft 89 is thus slidable for a limited distance within the sleeve or outer shaft 63, and through the medium of the pin 94 in the slots 95 and 96, longitudinal movement of said frame 64 and said loose idler roller 84 may be effected without interference with the rocking movement of or sliding said sleeve 63. It is desirable to effect the longitudinal reciprocation of the frame 64, which supports the guide-tubes 85, 86 and 87 and carries the wire-feeding mechanism, and therewith the idler roller 84, in order that the ends of the wires, from each of which a small quantity of solder has just been severed, may be withdrawn from the hot soldering iron during reciprocal movement of the latter to properly distribute the detached solder. To effect this operation, I provide a lever 97 pivoted at 98 to the bracket 99 on the frame 21 of the machine, one end of said lever being provided with a roller 100 operating in the groove 101 of said collar 93, and the other end thereof being provided with a roller 102 in coöperative positional relation to the cam 103 on the shaft 68, said cam being of such configuration that upon rotation of said shaft 68 the shaft 89, but not the sleeve 63, will be reciprocated. This shaft 89 terminates short of the outer end of the sleeve, and interposed between the ends of the former and the latter is the coil-spring 104 which tends to return said shaft 89, and therewith the frame 64 and the idler roll 84, to their original positions. Furthermore, the arm 65 is operated by the cam 67 to rock said shaft 63 and raise the soldering iron 59 just prior to operation of the cam 103 to permit the return of the frame 64 and the idler roll 84 under action of the spring 104 to such position that the ends of the three solder wires are again in position to be severed by the lip or cutting block 88 for the next succeeding soldering operation. When the cam 67 operates through the arm 65 to permit the lowering under gravity of the soldering iron 59, the cam 103 operates through the arm 97 to slide the frame 64 and the idler roll 84 against the action of the spring 104 and withdraw the ends of the solder wires from proximity to the soldering iron 59 to prevent the fusing of an unnecessary amount of solder.

In order to intermittently advance the solder wires to feed the ends thereof into proper position underneath the soldering iron, I loosely mount upon the sleeve 63 the two arms of the frame 106, in opposite sides of which is journaled the shaft or rod 107 upon which are pivoted three dogs, of which one 108 is best shown in Fig. 11, the others being identical thereto and each being so located that the sharp tooth thereof is in coöperative positional relation to the strand of solder wire which passes thereunder and around the roller 84. A spring 109 keeps the teeth of said dog in contact with the strand of solder wire, and it will be apparent that movement of said frame 106 in an upward direction will cause the dogs 108 to bite into said wires and advance the same, while during movement downwardly said wires will be released by said dogs. This frame is rotatable on the shaft 63 through the medium of the arm 110 secured to or forming a part of said frame, to the free end of which arm is pivoted the rod 111 having a slot 112 in the head 113 at its end, within which slot rotates the shaft 68. The head 113 of said rod 111 is provided with a pin 114, while said shaft 168 is provided with a cam 115 adapted to impinge against said pin and move said rod longitudinally to rock the frame 106 and raise the shaft 107, operating through the dogs 108 to advance the three strands of wire a proper distance through their respective guide tubes.

The frame 64, being secured to the inner shaft 89, reciprocates with said shaft and carries therewith the frame 106 between the arms of which is located the frame 64 and the idler roller 84. Otherwise, the frame 64 is stationary. In this frame I provide a shaft 117 upon which are mounted three spring-dogs, of which the one 118 shown in Fig. 11 is identical to all. These dogs bite the wire after it has been advanced and prevent return thereof through movement in a downward direction of the dogs in the frame 106. From a portion of this frame 64 projects downwardly a pin 119, limiting the rocking movement of said frame 106, and surrounding said pin 119 is a spring 120, in tension between said frame 64 and the arm 121 of said frame 106 to return said frame to a normally operative position after said cam 115 has passed the pin 114. The guide-tubes 85, 86 and 87 are suitably carried by the frame 64.

It will now be apparent that with the soldering iron 59 in its elevated position, as indicated in Fig. 7, the mandrel carrying the formed blank, with superposed edges clamped together, is brought thereunder, and the ends of the solder wires are in position to be engaged by the lip 88 of the descending iron. (Fig. 13.) The cam 67 now passes from under the roller 66 (Fig. 7) and the iron 59 descends by gravity, severing a small portion from the end of each solder wire which is fused and deposited upon the edges of the blank. Immediately thereafter, the cam 103 operates through the lever 97 to reciprocate the shaft 89 (Figs. 10 and 14), carrying therewith the frames 64 and 106 and removing the ends of the solder wires from close proximity to the hot soldering iron.

To check rotation of said head 33, and consequently to check movement of the formed blank during the soldering operation, I provide the shaft 30 with the fixed ratchet wheel 122 having as many teeth as there are mandrels on said head 33. Fulcrumed at 123 to a suitable part of the frame 21, is the lever 124, one arm thereof being provided with a pin 125 adapted to successively engage the teeth in said ratchet 122, the other end of said lever being provided with a roller 126 in the path of movement of the pin 127 on the disk wheel 128 fixed upon the shaft 22. This pin 127 is so located on the wheel 128 that the roller 126 is engaged and the pin 125 withdrawn from the notch in the ratchet 122 just after completing the soldering operation, whereby the shaft 30 is permitted to rotate through another step to bring the next succeeding formed blank under the soldering mechanism. A suitable spring 171 may be employed to yieldingly force the arm 124 in the direction of said ratchet. I have already explained that the horizontal shaft 24 is in two parts, coupled through the friction-drive device 167, whereby when said pin 125 is in engagement with one of the notches in the ratchet 122, the bevel gear 25, and that portion of the shaft 24 to which it is secured, will run idly, the resistance of the pin 125 overcoming the friction of the device 167, while where the pin 125 is withdrawn the friction of the device 167 will drive the shaft 30 and therewith the head 33. After the mandrel carrying the can body which has just been soldered has been withdrawn from underneath the soldering iron, and as each succeeding formed blank is brought thereunder, the head 33 is permitted to rotate three steps before the withdrawal or ejectment of the formed body, in order to permit the solder to cool and harden.

It will be apparent that in order to strip the formed can body from the mandrel, it will be first necessary to separate the arms 35 and 41 through movement of the arm 37 which depresses said arm 35. Furthermore, the can body being thus released, must be stripped from the mandrel and discharged into a chute or other suitable receptacle therefor. To accomplish this, I provide a shaft 129, slidable in suitable bearings in the frame 21 of the machine and in the sleeve 130 which is similarly slidable independent of said shaft 129. This sleeve 130 is provided with the two fixed collars 131 between which is retained the free end of the lever 132, fulcrumed at 133 to the frame 21 of the machine, and provided intermediate its ends with the roller 134 in coöperative positional relation to the cam 135 on the shaft 68. This cam 135 is of configuration to effect and properly time reciprocation of said lever 132, said lever being yieldingly held against said cam through the medium of a suitable tension spring 136, whereby said sleeve 130 is reciprocated through a limited distance by rotation of said shaft 68. This sleeve 130 is further provided with the collar 137, adapted upon reciprocation to impinge against the end of the lever 138 fulcrumed at 139, the other end 140 of which is adapted to be brought into the path of movement of one of the rollers 42 at the proper time to force inwardly the arm 37, thereby depressing the arm 35 and releasing the formed body.

The inner shaft 129, is reciprocated by means of the lever 141, fulcrumed at 142 to the frame 21 of the machine, to which is pivoted the arm 143, the other end of which is pivoted at 144 to the body of the cam 135. To the other end of the shaft 129 is secured the bar 145 which is provided with the upwardly directed arms 146 and 147, at the ends of which are suitably provided the spring-dogs 148 and 149 adapted to enter the longitudinal grooves 150 and 151 in the mandrel 34. It will be apparent that as the shaft 129 is reciprocated to the right (referring now to Fig. 3) the dogs 148 and 149 (see also Figs. 17 and 18) will yield to the interposed can body, but will spring into said grooves when said can body has been passed. As said shaft 129 is reciprocated to the left, said dogs, having entered said grooves, will engage the ends of the can body and strip the same from said mandrel and upon the chute 152, which may be so shaped and adjusted as to deliver said can body to any desired point. The mandrel from which the can body has just been stripped will now be carried forward one step to the position where it is ready for the positioning of another formed blank.

It will be apparent that there may at times be some delay in adjusting the formed blank upon the mandrel which has been brought into position for this operation. In order that the same may not be carried forward until said blank has been properly treated with the fluxing solution and adjusted, as described, I provide a bar 153 having a slot 154 within which is located the pin 155 on the frame 21 of the machine one end of said bar being loosely retained between the pins 156 and 157 on the rod 158 which is pivoted to the treadle 47. When the rod 48 is depressed, through depression of said treadle, this bar 153 being fulcrumed at 155, the other end thereof is brought into the path of movement of the stop 159 on the gear 70 (see Fig. 15). The slot 154 provides for some movement of the gear 170 after engagement between the pin 159 and the end of said bar 153, and such movement causes the pin 160 on said bar 153 to impinge against the lever 161 and release a suitable clutch 162 thereby causing the pulley 23 to run loosely upon the shaft 22. In this manner, not only is the power shut off, but the machine is positively stopped for proper adjustment of a formed blank upon the proper mandrel. The clutch-operating lever 161 is provided with an accessible handle 163 for hand operation of the same when desired. A spring 164, in tension between the pin 165 at the end of the shaft 129 and the pin 166 on the frame 21, returns the shaft 129 to its original position after operation of the arm 141.

I prefer that in the top face of the reciprocating arm 35, at the top of the mandrel 34, there be placed a strip 170 of enamel or similar composition, to which solder, upon cooling will not adhere—as it does to metal. Otherwise the soldered can body would be likely to adhere at times to the arm and prevent ejectment thereof.

With respect to the present invention, it will be noted: first, that the mandrels are readily detachable from the rotating head and, therefore, may be easily removed either for repair or for replacement by mandrels of different sizes and shapes; and, furthermore, that the block 40 may be similarly removed from the permanent arm 41 if necessary or desirable to adapt the machine for the soldering of can bodies of different size or shape; second, that the solder-feed device is under positive control, and the length of that portion of the end of each solder wire which is fed beneath the soldering iron may be easily varied to suit the requirements; third, that the rotating head, being, frictionally driven, may be readily stopped at any time either with or without stopping the other moving mechanisms of the machine, and automatically for predetermined intervals of time to enable a formed blank to be placed upon the proper mandrel and for the soldering operation; fourth, that said solder feed device is positively reciprocated to and from its operative position, for the reasons, explained; and, fifth, that the stop mechanism—that is, the mechanism for operating the clutch and throwing off the power—is not only under manual control, but is also automatically operated in case there is delay in properly adjusting a formed blank upon the mandrel.

Many modifications of minor details of my improved soldering machine will doubtless readily suggest themselves to those skilled in the art to which it appertains, and I therefore do not desire to limit my invention to the specific construction herein shown and described.

I claim as new and desire to secure by Letters Patent:

1. In a soldering machine, the combination, with suitable soldering mechanism, of frictionally-driven means for carrying the formed blanks to and from said soldering mechanism, and means actuated by the soldering-mechanism-actuating means for automatically bringing a stop into the path of movement of a portion of said carrying means just prior to the soldering operation and withdrawing said stop at the completion of said operation.

2. In a soldering machine, the combination, with suitable soldering mechanism, of frictionally-driven means for carrying the formed blanks to and from said soldering mechanism, and means actuated by the soldering-mechanism-actuating means for automatically bringing a stop into the path of movement of a portion of said carrying means just prior to the soldering operation without interruption of movement of said soldering-mechanism-actuating means.

3. In a soldering machine, the combination, with suitable soldering mechanism, of frictionally-driven means for carrying the formed blanks to and from said soldering-mechanism, and means actuated by the soldering-mechanism actuating means for automatically bringing a stop into the path of movement of a portion of said carrying means just prior to the soldering operation and withdrawing said stop at the completion of said operation without interruption of movement of said soldering-mechanism-actuating means.

4. In a soldering machine, the combination, with suitable soldering mechanism, of frictionally-driven means traveling in an endless path for carrying the formed blanks to and from said soldering mechanism, and means for automatically checking movement of said carrying means during the soldering operation.

5. In a soldering machine, the combination, with suitable soldering mechanism, of a frictionally-driven rotating head, a plurality of equidistant radially-arranged mandrels secured to said head, said mandrels being successively brought into coöperative positional relation to said soldering mechanism, a suitable stop, and means actuated by said soldering-mechanism-actuating means for bringing said stop into the path of movement of a portion of said head just prior to the soldering operation.

6. In a soldering machine, the combination, with suitable soldering mechanism, of a frictionally-driven rotating head, a plurality of equidistant radially-arranged mandrels secured to said head, said mandrels being successively brought into coöperative positional relation to said soldering mechanism, a suitable stop, and means actuated by said soldering-mechanism-actuating means for bringing said stop into the path of movement of a portion of said head just prior to the soldering operation and withdrawing said stop after completion of operation.

7. In a soldering machine, the combination, with suitable soldering mechanism, of a frictionally-driven rotating head, a plurality of equidistant radially-arranged mandrels secured to said head, said mandrels being successively brought into coöperative positional relation to said soldering mechanism, means for checking rotation of said head during each soldering operation, means for clamping together the superposed edges of a formed blank upon each mandrel, and means for releasing said clamping means at a proper point to mount a formed blank upon one of said mandrels while movement of said head is checked.

8. In a soldering machine, the combination, with suitable soldering mechanism, of a frictionally-driven rotating head, a plurality of equidistant radially-arranged mandrels secured to said head, said mandrels being successively brought into coöperative positional relation to said soldering mechanism, means for checking rotation of said head during each soldering operation, means for clamping together the superposed edges of a formed blank upon each mandrel, means for releasing said clamping means at a proper point to mount a formed blank upon one of said mandrels while movement of said head is checked, and means for again releasing the clamping means on each mandrel after the soldering operation.

9. In a soldering machine, the combination, with a suitable soldering mechanism, of a frictionally-driven rotating head, a plurality of equidistant radially-arranged mandrels secured to said head, said mandrels being successively brought into coöperative positional relation to said soldering mechanism, means for checking rotation of said head during each soldering operation, means for clamping together the superposed edges of a formed blank upon each mandrel, means for releasing said clamping means at a proper point to mount a formed blank upon one of said mandrels while movement of said head is checked, and means for again releasing said clamping means on each mandrel after the soldering operation and ejecting the soldered body from the mandrel.

10. In a soldering machine, the combination, with suitable soldering mechanism, of an intermittently rotating head, a plurality of mandrels detachably secured to said head in equidistant radial arrangement, said mandrels being successively brought into coöperative positional relation to said soldering mechanism, means for clamping together the superposed edges of a formed blank upon each mandrel, means for releasing said clamping means at a proper point to mount a formed blank on one of said mandrels while said head is at rest, and means operated by said clamp-releasing means after a predetermined interval of time to stop the machine.

11. In a soldering machine, the combination, with suitable soldering mechanism, of an intermittently rotating head, a plurality of mandrels detachably secured to said head in equidistant radial arrangement, said mandrels being successively brought into coöperative positional relation to said soldering mechanism, means for clamping together the superposed edges of a formed blank upon each mandrel, means for releasing said clamping means at a proper point to mount a formed blank on one of said mandrels while said head is at rest, means for again releasing said clamping means on each mandrel after the soldering operation, and means operated by said clamp-releasing means after a predetermined interval of time to stop the machine.

12. In a soldering machine, the combination, with suitable soldering mechanism, of an intermittently rotating head, a plurality of mandrels detachably secured to said head in equidistant radial arrangement, said mandrels being successively brought into coöperative positional relation to said soldering mechanism, means for clamping together the superposed edges of a formed blank upon each mandrel, means for releasing said clamping means at a proper point to mount a formed blank on one of said mandrels while said head is at rest, means for again releasing said clamping means on each mandrel after the soldering operation and ejecting the soldered body from said mandrel, and means operated by said clamp-releasing means after a predetermined interval of time to stop the machine.

13. In a soldering machine, the combination, with suitable soldering mechanism, of a frictionally-driven rotating head, a plurality of equidistant radially-arranged mandrels secured to said head, said mandrels being successively brought into coöperative positional relation to said soldering mechanism, means for checking rotation of said head during each soldering operation, means for clamping together the superposed edges of a formed blank upon each mandrel, means for releasing said clamping means at a proper point to mount a formed blank upon one of said mandrels while movement of said head is checked, and means operated by said clamp-releasing means after a predetermined interval of time to stop the machine.

14. In a soldering machine, the combination, with suitable soldering mechanism, of a frictionally-driven rotating head, a plurality of equidistant radially-arranged mandrels secured to said head, said mandrels being successively brought into coöperative positional relation to said soldering mechanism, means for checking rotation of said head during each soldering operation, means for clamping together the superposed edges of a formed blank upon each mandrel, and means for releasing said clamping means at a proper point to mount a formed blank upon one of said mandrels while movement of said head is checked, means for again releasing said clamping means on each mandrel after the soldering operation, and means operated by said clamp-releasing means after a predetermined interval of time to stop the machine.

15. In a soldering machine, the combination, with a suitable soldering mechanism, of a frictionally-driven rotating head, a plurality of equidistant radially-arranged mandrels secured to said head, said mandrels being successively brought into coöperative positional relation to said soldering mechanism, means for checking rotation of said head during each soldering operation, means for clamping together the superposed edges of a formed blank upon each mandrel, means for releasing said clamping means at a proper point to mount a formed blank upon one of said mandrels while movement of said head is checked, and means for again releasing said clamping means on each mandrel after the soldering operation and ejecting the soldered body from the mandrel, and means operated by said clamp-releasing means after a predetermined interval of time to stop the machine.

16. In a soldering machine, the combination of a rocking sleeve, a shaft within said sleeve rocked therewith and reciprocable independently thereof, a soldering iron longitudinally reciprocable in a support fixed upon said sleeve, means for rocking said sleeve, means for reciprocating said shaft, a solder-feed device fixed on said shaft, and means for supporting a formed blank in coöperative positional relation to said soldering iron.

17. In a soldering machine, the combination of a rocking sleeve, a shaft within said sleeve rocked therewith and reciprocable independently thereof, a soldering iron longitudinally reciprocable in a support fixed upon said sleeve, means for rocking said sleeve, means for reciprocating said shaft, a solder-feed device fixed on said shaft, means for supporting a formed blank in coöperative positional relation to said soldering iron, means movable therewith for heating said soldering iron, and means for rocking said sleeve.

18. In a soldering machine, the combination of a rocking sleeve, a shaft within said sleeve rocked therewith and reciprocable independently thereof, a soldering iron longitudinally reciprocable in a support fixed upon said sleeve, means for rocking said sleeve, means for reciprocating said shaft, a solder-feed device fixed on said shaft, and means for bringing a plurality of formed blanks successively into coöperative positional relation to said soldering iron.

19. In a soldering machine, the combination of a rocking sleeve, a shaft within said sleeve rocked therewith and reciprocable independently thereof, a soldering iron longitudinally reciprocable in a support fixed upon said sleeve, means for rocking said sleeve, means for reciprocating said shaft, a solder-feed device fixed on said shaft, means for supporting a formed blank in coöperative positional relation to said soldering iron, and means for independently timing said rocking, reciprocating and solder-feeding operations.

20. In a soldering machine, the combination of a rocking sleeve, a shaft within said sleeve rocked therewith and reciprocable independently thereof, a soldering iron longitudinally reciprocable in a support fixed upon said sleeve, means for rocking said sleeve, means for reciprocating said shaft, a solder feed device fixed on said shaft, means for bringing a plurality of formed blanks successively into coöperative positional relation to said soldering iron, and means for independently timing said rocking, reciprocating, solder-feeding and blank-positioning operations.

21. In a soldering machine, the combination, with the soldering mechanism, a carrying and supporting mandrel, and means for clamping the superposed end edges of a formed blank around said mandrel, of means for manually releasing said clamping means for the positioning of a blank prior to the soldering operation, and means for automatically releasing said clamping means for the ejectment of the soldered body.

22. In a soldering machine, the combination, with suitable soldering-mechanism, a series of carrying and supporting mandrels, and means upon each of said mandrels for clamping the superposed end edges of a formed blank therearound, of means for manually releasing the clamping means on each mandrel for the positioning of a blank prior to the soldering operation, and means for automatically releasing each of said clamping means successively for the ejectment of the soldered body.

23. In a soldering machine, the combination, with suitable soldering mechanism, a series of carrying and supporting mandrels, means for successively bringing each mandrel in coöperative positional relation to said soldering mechanism, and means upon each mandrel for clamping the superposed end edges of a formed blank therearound, of means for manually releasing each of said clamping means for the positioning of a blank prior to the soldering operation and means for automatically releasing said clamping means for the ejectment of the soldered body.

24. In a soldering machine, the combination with suitable soldering mechanism, of a rotating head, a mandrel secured thereto, a lever fulcrumed in said head and normally forming the upper face of said mandrel, means for yieldingly retaining said lever in its normal position, an abutment coöperating with said lever to clamp together the superposed end edges of a formed blank on said mandrel, and means for operating said lever to separate the same from said abutment and permit the positioning of a formed blank on said mandrel.

25. In a soldering machine, the combination, with suitable soldering mechanism, of a rotating head, a plurality of mandrels secured thereto in equidistant radial arrangement, a corresponding number of levers fulcrumed in said head, each in its normal position forming the upper face of a mandrel, means for yieldingly retaining each lever in its normal position, an abutment coöperating with said lever to clamp together the superposed end edges of a formed blank on the mandrel, and means for operating said lever to separate the same from said abutment and permit the positioning of a formed blank on the mandrel.

26. In a soldering machine, the combination, with suitable soldering mechanism, of a rotating head, a plurality of mandrels detachably secured thereto in equidistant radial arrangement, a corresponding number of levers fulcrumed in said head, each in its normal position forming the upper face of a mandrel, means for yieldingly retaining each lever in its normal position, an abutment coöperating with said lever to clamp together the superposed end edges of a formed blank on the mandrel, and means for operating said lever to separate the same from said abutment and permit the positioning of a formed blank on the mandrel.

27. In a soldering machine, the combination, with suitable soldering mechanism, of a rotating head, a plurality of mandrels secured thereto in equidistant arrangement, a corresponding number of bell-crank levers fulcrumed in said head, the upper arm of each lever in its normal position forming the upper face of a mandrel, means for yieldingly retaining each lever in its normal position, an abutment coöperating with the upper arm of each lever to clamp together the superposed end edges of a formed blank on the mandrel, and means operating against the lower arm of each lever to depress the upper arm thereof for the positioning of a formed blank on the mandrel.

28. In a soldering machine, the combination, with suitable soldering mechanism, of a rotating head, a plurality of mandrels detachably secured thereto in equidistant radial arrangement, a corresponding number of bell-crank levers fulcrumed in said head, the upper arm of each lever in its normal position forming the upper face of a mandrel, means for yieldingly retaining each lever in its normal position, an abutment coöperating with the upper arm of said lever to clamp together the superposed end edges of a formed blank on the mandrel, and means operating against the other arm of each lever to separate the upper arm thereof from said abutment and permit the positioning of a formed blank on said mandrel.

29. In a soldering machine, the combination, with suitable soldering mechanism, of a rotating head, a mandrel secured thereto, a lever fulcrumed in said head and normally forming the upper face of said mandrel, means for yieldingly retaining said lever in its normal position, an abutment coöperating with said lever to clamp together the superposed end edges of a formed blank on said mandrel, means for manually operating said lever to separate the same from said abutment and permit the positioning of a formed blank on said mandrel, and means for automatically effecting such separation for the ejectment of the soldered body.

30. In a soldering machine, the combination, with suitable soldering mechanism, of a rotating head, a plurality of mandrels detachably secured thereto in equidistant radial arrangement, a corresponding member of levers fulcrumed in said head, each in its normal position forming the upper face of a mandrel, means for yieldingly retaining each lever in its normal position, an abutment coöperating with said lever to clamp together the superposed end edges of a formed blank on the mandrel, means for manually operating said lever to separate the same from said abutment and permit the positioning of a formed blank on the mandrel, and means for automatically effecting such separation for the ejectment of the soldered body.

31. In a soldering machine, the combination, with suitable soldering mechanism, of a rotating head, a plurality of mandrels secured thereto in equidistant radial arrangement, a corresponding number of bell-crank levers fulcrumed in said head, the upper arm of each lever in its normal position forming the upper face of a mandrel, means for yieldingly retaining each lever in its normal position, an abutment coöperating with the upper arm of each lever to clamp together the superposed end edges of a formed blank on the mandrel, manually actuated means operating against the lower arm of each lever to depress the upper arm thereof for the positioning of a formed blank on the mandrel, and means for automatically effecting such depression for the ejectment of the soldered body.

32. In a soldering machine, the combination, with suitable soldering mechanism, of a rotating head, a plurality of mandrels detachably secured thereto in equidistant radial arrangement, a corresponding number of bell-crank levers fulcrumed in said head, the upper arm of each lever in its normal position forming the upper face of a mandrel, means for yieldingly retaining each lever in its normal position, an abutment coöperating with the upper arm of said lever to clamp together the superposed end edges of a formed blank on the mandrel, manually actuated means operating against the other arm of each lever to separate the upper arm thereof from said abutment and permit the positioning of a formed blank on said mandrel, and means for automatically effecting such separation for the ejectment of a soldered body.

In testimony of the foregoing, I have hereunto set my hand in the presence of two witnesses.

JULIUS BRENZINGER.

Witnesses:
    FRED H. BOWERSOCK,
    P. FRANK SOURCELL.